United States Patent
Liesenfeld

(10) Patent No.: US 11,338,854 B2
(45) Date of Patent: May 24, 2022

(54) STEERING ASSIST DEVICE

(71) Applicant: TRW Automotive GmbH, Alfdorf (DE)

(72) Inventor: Guido Liesenfeld, Neuss (DE)

(73) Assignee: ZF Automotive Germany GmbH, Alfdorf (DE)

( * ) Notice: Subject to any disclaimer, the term of this patent is extended or adjusted under 35 U.S.C. 154(b) by 380 days.

(21) Appl. No.: 16/460,032

(22) Filed: Jul. 2, 2019

(65) Prior Publication Data

US 2020/0017144 A1    Jan. 16, 2020

(30) Foreign Application Priority Data

Jul. 16, 2018  (DE) .......................... 102018117155.2

(51) Int. Cl.
   *B62D 15/02*    (2006.01)
   *B62D 5/04*     (2006.01)

(52) U.S. Cl.
   CPC ........ *B62D 15/0235* (2013.01); *B62D 5/0463* (2013.01)

(58) Field of Classification Search
   CPC .. B62D 15/0235; B62D 5/0463; B62D 5/046; B62D 5/0481; B62D 5/0487; B62D 15/02; B62D 15/021; B62D 15/0225
   See application file for complete search history.

(56) References Cited

U.S. PATENT DOCUMENTS

| | | | |
|---|---|---|---|
| 6,400,278 B1* | 6/2002 | Weyerstall | E05B 81/25 292/216 |
| 6,539,816 B2* | 4/2003 | Kogiso | G01L 5/221 73/862.334 |
| 7,159,688 B2* | 1/2007 | Onizuka | B62D 5/0409 180/444 |
| 7,204,167 B2* | 4/2007 | Chikaraishi | B62D 5/0409 180/444 |
| 7,426,978 B2* | 9/2008 | Onizuka | B62D 5/0409 180/444 |
| 8,868,297 B2* | 10/2014 | Yoshitake | B62D 5/0463 701/42 |
| 8,924,083 B2* | 12/2014 | Yoshitake | B62D 5/049 701/42 |
| 10,589,782 B2* | 3/2020 | Takayanagi | B62D 15/0225 |
| 10,625,772 B2* | 4/2020 | Sasaki | B62D 5/0463 |
| 2018/0009476 A1* | 1/2018 | Takayanagi | B62D 15/0225 |
| 2018/0312191 A1* | 11/2018 | Sasaki | B62D 5/049 |

FOREIGN PATENT DOCUMENTS

| | | |
|---|---|---|
| DE | 102012215081 A1 | 2/2013 |
| DE | 102013109284 A1 | 3/2015 |
| DE | 102015000928 B3 | 7/2016 |
| EP | 1495942 A1 | 1/2005 |

* cited by examiner

*Primary Examiner* — Minnah L Seoh
*Assistant Examiner* — Michael R Stabley
(74) *Attorney, Agent, or Firm* — Robert James Harwood

(57) ABSTRACT

A steering assist device for a motor vehicle is described, which encloses a steering-wheel-side steering shaft and a wheel-side steering shaft coupled to the latter, whereby a gear wheel coupled to a backup drive is installed on the wheel-side steering shaft. Moreover, a sensor element is integrated into the gear wheel and interacts with a second sensor counter element fixed in space over a first sensor counter element installed at the steering-wheel-side steering shaft.

20 Claims, 2 Drawing Sheets

STEERING ASSIST DEVICE

CROSS-REFERENCE TO RELATED APPLICATIONS

This application claims priority to German Patent Application No. 102018117155.2, filed 16 Jul. 2018, the disclosure of which is incorporated herein by reference in its entirety.

TECHNICAL FIELD

The present disclosure relates to a steering assist device for a motor vehicle with a steering-wheel-side steering shaft at the steering wheel and a wheel-side steering shaft coupled to the latter, whereby a gear wheel coupled to a backup drive is installed on the wheel-side steering shaft.

BACKGROUND

A known steering assist device is, for example, described in DE 10 2015 000 928 B3. The backup drive is used here to insert an auxiliary torque into the wheel-side steering shaft. Accordingly, the steering assist device is also described as a device for inserting an auxiliary torque in DE 10 2015 000 928 B3.

Usually, while operating known steering assist devices, a relative twisting of the steering-wheel-side steering shaft compared to the wheel-side steering shaft, a twisting of the wheel-side steering shaft compared to a housing, and a steering torque inserted in the steering-wheel-side steering shaft are sensorially detected. Based on the corresponding sensor values, the backup drive is then controlled or regulated.

In the solution in accordance with DE 10 2015 000 928 B3, the sensors required for detecting the above-mentioned parameters are placed in a sensor housing installed in the range of the wheel-side steering shaft, which has a certain installation space requirement.

Therefore, there is a need for a steering assist device which features a particularly compact construction. Moreover, exact control of the backup drive must be ensured.

SUMMARY

The present disclosure provides a steering assist device where a sensor element is integrated into the gear wheel and interacting over a first sensor counter element installed at the steering-wheel-side steering shaft with a second, sensor counter element fixed in space. An integrated sensor element here is a sensor element that is firmly connected with a gear wheel and essentially is forming geometrically a unit with it. In particular, integrated sensor elements are not sensor elements, which are positioned in housings, which are separate, but connected with a gear wheel. By integrating the sensor elements, a particularly compact construction of the steering assist device is ensured. This particularly applies in the direction of a central axis allocated to the steering-wheel-side steering shaft and/or to the wheel-side steering shaft. Therefore, the steering assist device is axially short. Since the sensor positioning of the steering assist device encloses each an element connected with the steering-wheel-side steering shaft, an element connected with the wheel-side steering shaft as well as an element fixed in space, the parameters initially mentioned can be detected concurrently with high accuracy. On this basis, a backup drive can be operated precisely and reliably.

The sensor counter element fixed in space, for example, is positioned in a housing, compared to which the wheel-side steering shaft can be rotated. The sensor counter element fixed in space can therefore also be called fixed to the housing. The housing can be solely a sensor housing that is designed to encase the above-mentioned sensor element and the allocated sensor counter elements and is, for example, inserted into a housing of the steering assist device. The housing of the steering assist device can also be described as a transmission housing. The housing can also be described as a combined sensor and transmission housing. Then it also encases transmission components, such as the gear wheel.

The sensor element can be glued to the gear wheel or integrated into it by primary shaping. For example, the sensor element is cast in gear wheel. Other suitable methods for integrating the sensor element are also possible. For example, the sensor element can be permanently fixed to the gear wheel by soldering and welding processes.

In accordance with an embodiment, the gear wheel can be a worm wheel and the backup drive can be coupled to a gear wheel over a worm meshing with the gear wheel. The term worm can be understood here as a component of a worm-wheel transmission. As a backup drive, an electric motor is preferably used. Such backup drives and corresponding worm-wheel transmissions are proven state of the art. In particular, they have minimal installation space and are reliable in operating.

In accordance with a design alternative, the sensor element encloses at least one magnetic element. The magnetic element is, for example, a permanent magnet. The magnetic element can also be a magnetic track, which encloses several permanent magnets. Along the magnetic track, variably magnetized ranges or not magnetized and magnetized areas can alternate. Preferably, the magnetic track is essentially configured as a ring-shaped or annular-shaped track, which is extending in a radius essentially constant around a rotation axis of the gear wheel. Particularly accurate sensor values can be generated over such a magnetic element. Moreover, magnetic elements and/or magnetic tracks are comparably of compact construction.

In an option, several, essentially ring-shaped magnetic tracks extending parallel to each other are provided. One of the magnetic tracks can be configured here as a so-called coarse track and another one of the magnetic tracks as a so-called fine track. In this case, a comparably coarse range of the sensor value generated by the sensor element is determined by the coarse track. By the allocated fine track, a comparably accurate sensor value is then determined within the coarse range. Consequently, the accuracy of the sensor element can be increased by several magnetic tracks extending parallel to each other. It goes without saying that the principle described based on a single coarse track and a single fine track can also be extended to more than two magnetic tracks. The accuracy of the sensor element is further increased by that. After integrating the magnetic tracks into the gear wheel, the required installation space essentially independent from the number of provided magnetic tracks.

Preferably, the first sensor counter element encloses a variable magnetic resistor or a magnetic flux conductor and/or the second sensor counter element a magnetic flux sensor. This construction is particularly simple and compact.

In this context, a magnetic flux conductor directs a magnetic field into the range of the first sensor counter element. The magnetic field can start from magnetic elements, which are positioned at a place away from the sensor counter element. Depending on the orientation of the magnetic field provided across the magnetic flux conductor, it can have the same effect on a magnetic field predominating in the range of the first sensor counter element as with a magnetic resistor. This applies particularly, if the magnetic field provided by the magnetic flux conductor is orientated compared to the magnetic field predominating in this range.

The magnetic flux sensor is configured here to detect different magnetic fluxes originating from the sensor element. Preferably, the magnetic flux sensor is a Hall sensor.

The variable magnetic reluctance of the first sensor counter element preferably changes regarding the steering-wheel-side steering shaft in circumferential direction. The variable magnetic reluctance is preferably positioned at or on a support disc connected rotationally fixed with the steering-wheel-side steering shaft. Consequently, a different magnetic reluctance is juxtaposed compared to the sensor element installed on the gear wheel and therefore connected rotationally fixed with the wheel-side steering shaft depending on the relative position of the steering-wheel-side steering shaft. Moreover, the size of the reluctance also depends on the position of the first sensor counter element in the space or compared to the housing.

The first sensor counter element can also additionally enclose a magnetic flux concentrator device. Consequently, a magnetic flux originating from the sensor element can be concentrated, i.e. that the magnetic flux density is locally increased. Particularly, the magnetic flux is concentrated in such a way that there is a high magnetic flux in the range of the second sensor counter element.

The sensor element, the first sensor counter element and/or the second sensor counter element can be a part of an angle rotation sensor, which is configured to detect a relative rotation of the steering-wheel-side steering shaft compared to the wheel-side steering shaft. Such an angle rotation sensor is of compact construction and delivers accurate sensor values with regards to the relative rotation when operated. Its functionality is as follows: In its initial position, a magnetic flux originates from the sensor element, which is changed by the magnetic resistor of the first sensor counter element and detected by the magnetic flux sensor of the second sensor counter element. If the sensor element is now twisted relatively to the first sensor counter element, the magnetic flux fixed in space and in the housing and detected by the second sensor counter element changes. This way, a relative rotation of the steering-wheel-side steering shaft compared to wheel-side steering shaft can be detected. Such an angle rotation sensor can provide comparably accurate sensor values for the relative rotation and is simple as well as of compact construction.

In a variant, the steering-wheel-side steering shaft and die wheel-side steering shaft are coupled to each other by a torsion element. For example, torsion elements are a torsion rod, a membrane as well as a bending lever in this context. A coupling of the steering-wheel-side steering shaft and the wheel-side steering shaft by a torsion element is proven state of the art. It is simple, compact, and reliable.

The sensor element, the first sensor counter element and/or the second sensor counter element can be a part of a torque sensor, which is configured to detect a steering torque inserted in the steering-wheel-side steering shaft, in connection with the torsion element. The sensor element, the first sensor counter element and/or the second sensor counter element are, as already explained above, a part of an angle rotation sensor, which is configured to detect a relative rotation of the steering-wheel-side steering shaft compared to the wheel-side steering shaft. The effects and advantages result from this accordingly. In addition, the mechanical torsional properties of the torsion element, particularly its torsional rigidity, are assumed to be known. From the combination of this information, i.e. the relative rotation and the mechanical torsional properties, an applied torque can be deduced based on the rotation angle. The named elements are consequently forming a simple, compact and reliably functioning torque sensor.

The gear wheel is advantageously made of plastic at least in sections, preferably made entirely of plastic. Such a gear wheel can be manufactured particularly easy and cost-effective. This applies particularly, if large quantities of the gear wheel are to be produced. At least in the range of the sensor element, the gear wheel is made of plastic. Another advantage of such a gear wheel is that plastic is usually transparent for magnetic fields. Consequently, an incident of a sensor element based on magnetic principles can be excluded. In addition, the integration of a sensor element is especially simple with such a gear wheel.

In accordance with a preferred embodiment, the gear wheel is moulded on the wheel-side steering shaft. Consequently, the gear wheel and the wheel-side steering shaft can be connected with each other with particularly low expenditure. The assembly with gear wheel and wheel-side steering shaft is also comparatively compact, since no separate connecting elements must be provided.

The steering assist device can enclose a third sensor counter element, which is positioned fixed in space and interacts with the gear wheel. In this context, fixed in space can mean that the third sensor counter element is installed at a sensor housing and/or transmission housing.

The sensor element, the first sensor counter element and/or the second sensor counter element can be a part of an angle rotation sensor, which is configured to detect a rotational position of the wheel-side steering shaft. After the third sensor counter element is positioned fixed in space or fixed in a housing, an absolute rotational position of the wheel-side steering shaft can consequently be detected. With such a sensor information, the backup drive can be controlled particularly accurate.

Preferably, the third sensor counter element encloses a magnetic flux sensor, particularly a Hall sensor. The advantages and effects of such a sensor are resulting according to the explanations for the second sensor counter element and the magnetic flux sensor enclosed by it.

In accordance with an embodiment, the third sensor element operates over a transmission, particularly a reduction gear, together with the gear wheel. Such a transmission is tuning the third sensor element, more precisely the detection range of the third sensor element, to a range of motion of the gear wheel. Consequently, a particularly high-level accuracy can be ensured by the transmission in a small space when sensorially detecting a rotational position of the gear wheel.

Depending on the embodiment of the transmission, a transmission element directly interacting with the sensor element moves faster or slower than the gear wheel. Consequently, its detection accuracy and/or its detection range can be increased depending on the sensor principle used.

Preferably, the transmission encloses a first, rotationally fixed transmission wheel connected with the gear wheel, which is coupled to a second transmission wheel enclosing a rotation axis fixed in space. Preferably, both transmission wheels are gear wheels. Consequently, the gear wheel and the third sensor element are coupled to each other particularly simple and reliable. Moreover, the coupling is meeting high tolerance requirements.

At the second transmission wheel, at least a magnetic element can be positioned. This magnetic element can interact with the third sensor element in such a way that a rotational position of the gear wheel is detected. Such a sensor, consequently, enables a particularly compact construction.

At least one stop can also be provided at the gear wheel, with which a relative rotation of the steering-wheel-side steering shaft is limited compared to the wheel-side steering shaft. Two stops can also be provided, so that a relative rotation of the steering-wheel-side steering shaft is limited in two rotation directions compared to the wheel-side steering shaft. With such a stop, the components of the steering assist device are protected from the consequences of excessive twisting of the steering-wheel-side steering shaft compared to the wheel-side steering shaft. Such excessive twisting can occur in an accident or other case of failure.

The stop can also help, even in a case, when the torsion element is defective, to provide another coupling between the steering-wheel-side steering shaft and the wheel-side steering shaft. Consequently, an emergency operation of the steering assist device is provided.

In addition, a variant intends to implement the sensor element fixed in space and the transmission wheel as a unit that can be inserted into the housing. Consequently, a simple and compact construction of the steering assist device is achieved.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1:
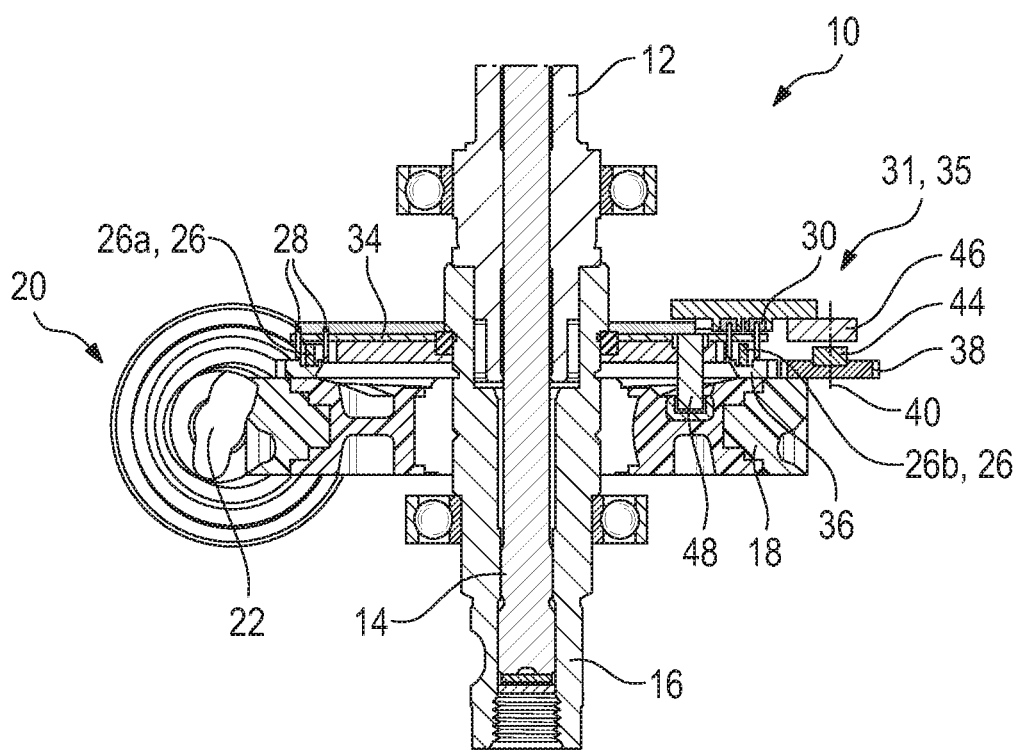
FIG. 1 illustrates a steering assist device according to the invention in a cross-sectional view.

Referring now to FIG. 1, FIG. 1 shows a steering assist device 10 for a motor vehicle not closer depicted. A steering-wheel-side steering shaft 12 over a torsion element 14, which is embodied in the displayed embodiment as a torsion rod is coupled to a wheel-side steering shaft 16 here. Moreover, the steering assist device 10 encloses a gear wheel 18, which is installed on the wheel-side steering shaft 16. This is coupled to a backup drive 20.

In the displayed embodiment, the gear wheel 18, a worm wheel and the backup drive 20 are coupled to this over a worm 22 meshing with the gear wheel 18. The backup drive 20 is configured to insert an additional torque into the wheel-side steering shaft 16. In addition, it means in this context that the torque inserted by the backup drive 20 is superimposed by a torque inserted over a steering-wheel-side steering shaft 12. Therefore, the additional torque is also described as an auxiliary torque. The gear wheel 18 is entirely made of plastic in the shown embodiment.

Figure 2:
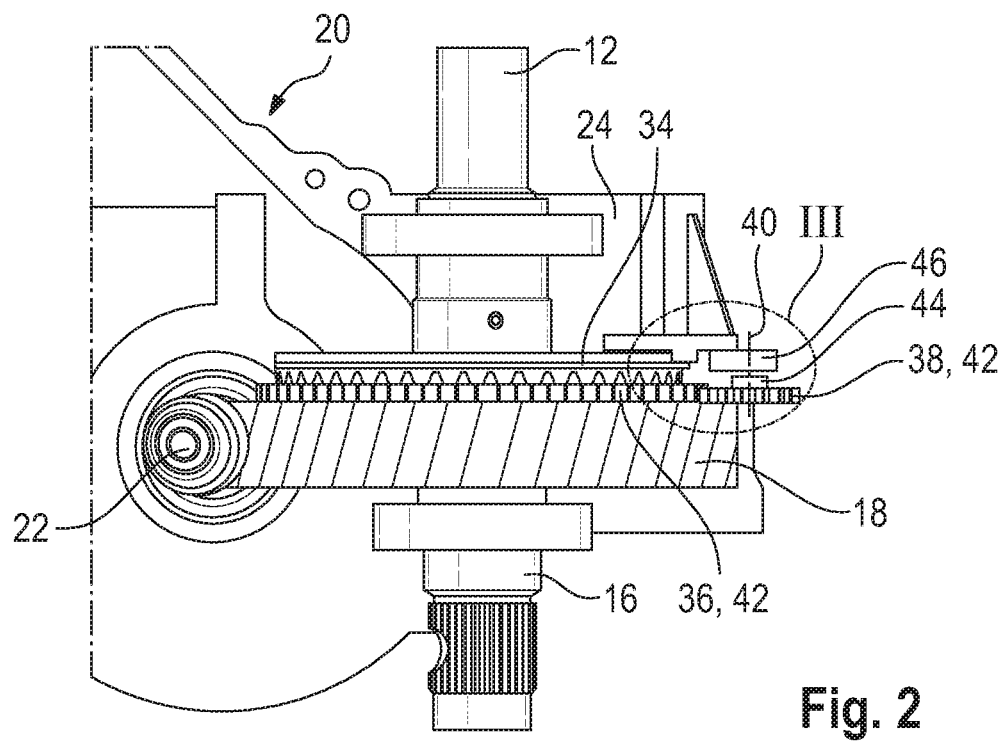
FIG. 2 illustrates the steering assist device from FIG. 1 in an uncut view.
Figure 3:
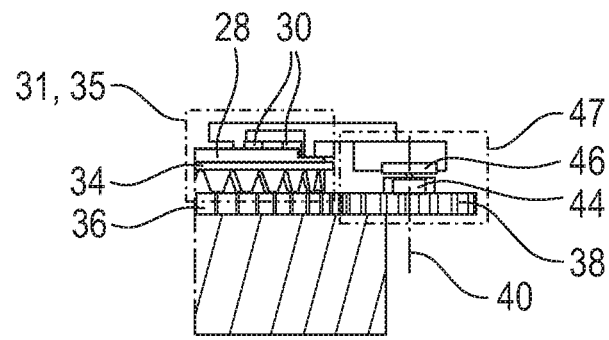
FIG. 3 illustrates a Detail III of the steering assist device from FIG. 2.

The steering assist device 10 also encloses a housing 24 (see FIG. 2), which is encasing at least a range of the gear wheel 18, The housing 24 at hand is made of plastic, but can also be made of metal. Moreover, a sensor element 26, which encloses at least a magnetic element, is integrated into the gear wheel 18. In FIG. 1, two magnetic elements 26a, 26b only schematically displayed can be seen as an example.

To see them better, the magnetic elements 26a, 26b protrude more than in reality compared to the gear wheel 18. Consequently, the magnetic elements 26a and 26a as well as the sensor element are sufficient for the above-mentioned definition, wherein they are firmly connected with the gear wheel and essentially form a unit geometrically with this. The sensor element 26 interacts here with a second sensor counter element 30 fixed in space over a first sensor counter element 28 installed at the steering-wheel-side steering shaft 12.

In the exemplary embodiment at hand, fixed in space can be understood in such a way that the second sensor counter element 30 is installed at the housing 24. The sensor element 26, the first sensor counter element 28 and the second sensor counter element 30 are parts of an angle rotation sensor 31, which is configured to detect a relative rotation of the steering-wheel-side steering shaft 12 compared to the wheel-side steering shaft 16. Therefore, a relative rotation angle is detected.

Figure 4:
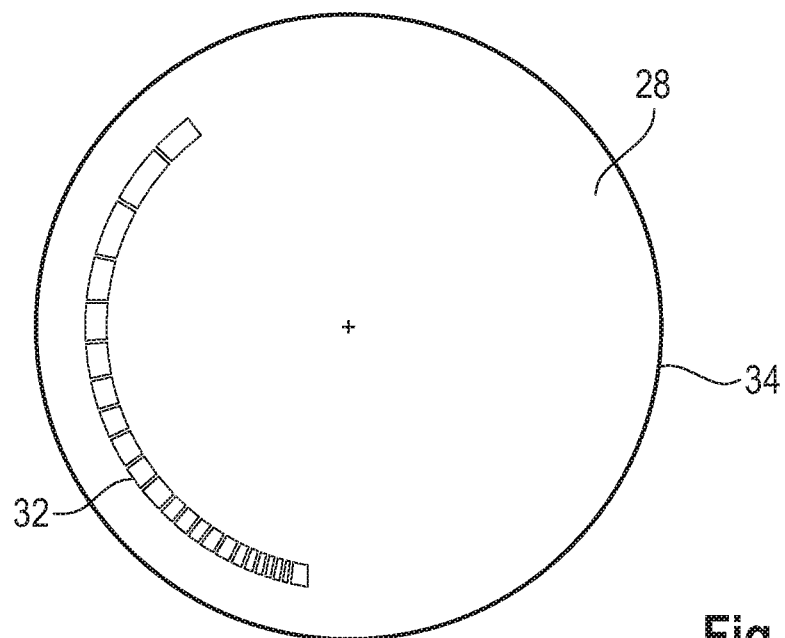
FIG. 4 illustrates another Detail III of the steering assist device from FIGS. 1 and 2.

For that, the second sensor counter element 30 encloses a magnetic flux sensor, in the example shown a Hall sensor. It can detect the magnetic flux originating from the magnetic elements 26a, 26b of the sensor element 26, The first sensor counter element 28 also includes a variable magnetic resistor (see also FIG. 4). The variable magnetic reluctance in FIG. 4 is symbolized by a dotted line 32. In this context, long line sections of line 32 show a comparatively high magnetic reluctance and short line sections a comparatively low one. It can be seen that the magnetic reluctance changes in one circumferential section of the first sensor counter element 28, whereby it always increases in a rotation direction of the first sensor counter element 28 and decreases in the opposite rotation direction within the circumferential section.

In addition, the first sensor counter element 28 encloses a support disc 34, where the variable magnetic reluctance is installed. The variable magnetic reluctance can be formed by a layer changing in thickness of a material with a magnetic reluctance or generated by the properties of the material of the sensor element 28. In the latter case, the material of the sensor element 28 displays a changing magnetic reluctance. Alternatively, it can be based on the principle of flux line and transmit an overlapped magnetic field originating from the magnetic elements 26a, 26b to the second sensor counter element 30.

The second sensor counter element 30, more precisely its magnetic flux sensor, detects consequently the magnetic flux modified by the variable magnetic resistor originating from the sensor element 26. Hereby, it allow reference to a relative twisting of the steering-wheel-side steering shaft 12 compared to the wheel-side steering shaft 16.

If, in addition, the torsional properties of the torsion element are known, particularly its torsional rigidity, it also allows reference to a torque, which is inserted in the steering-wheel-side steering shaft 12, from the relative twisting of the steering-wheel-side steering shaft 12 compared to the wheel-side steering shaft 16. Consequently, there is a torque sensor 35.

A first transmission wheel 36 is also connected rotationally fixed with the gear wheel 18. For practical purposes, it can be cost-effectively manufactured together with the gear wheel 18 in one piece. It is coupled to a second transmission wheel 38, whose rotation axis 40 is fixed relative to the housing 24.

The first transmission wheel 36 and the second transmission wheel 38 form a transmission 42. Hereby, both transmission wheels 36, 38 in the embodiment shown are gear wheels. Other embodiments, e.g. in form of hypocyclical transmissions, are possible depending on the required gear ratio.

In addition, a magnetic element 44 is installed on the second transmission wheel 38. This interacts with a third sensor counter element 46, which is positioned at the housing 24 in the exemplary embodiment at hand in accordance with the above-mentioned definition of fixed in space. Hereby, the third sensor counter element 46 is part of an angle rotation sensor 47, which is configured to detect a rotational position of the wheel-side steering shaft 16.

For that reason, the third sensor counter element 46 encloses a magnetic flux sensor, which is a Hall sensor at hand. This detects a magnetic flux, which originates from the magnetic element 44. Consequently, the third sensor counter element 46 interacts with the gear wheel 18 over the transmission 42.

While the magnetic flux sensor enclosed by the third sensor counter element 46 detects a magnetic flux, which originates from the magnetic element 44, a rotational position of the gear wheel 18 compared to the housing 24 can be detected. In the exemplary embodiment at hand, this rotational position is in accordance with an absolute rotation possible of the gear wheel 18.

A stop 48 is also provided at the gear wheel 18, with which a relative rotation of the steering-wheel-side steering shaft 12 is limited compared to the wheel-side steering shaft 16. The integration of a torsionally elastic element as a replacement for the torsion element 14 is also possible here.

What is claimed is:

1. A steering assist device for a motor vehicle with a steering-wheel-side steering shaft and a wheel-side steering shaft coupled to one another, whereby a gear wheel coupled to a backup drive is installed on the wheel-side steering shaft, thereby identified that a sensor element is integrated into the gear wheel, a second sensor counter element is fixed in space and a first sensor counter element is installed at the steering-wheel-side steering shaft, magnetic flux originating from the sensor element being modified by the first sensor counter element, the second sensor counter element detecting the modified magnetic flux.

2. The steering assist device in accordance with claim 1, thereby identified that the gear wheel is a worm wheel and the backup drive is coupled to the gear wheel by a worm that meshes with the gear wheel.

3. The steering assist device in accordance with claim 1 wherein the sensor element includes at least one magnetic element.

4. The steering assist device in accordance with claim 1 wherein the first sensor counter element includes a variable magnetic resistor or a magnetic flux conductor and/or the second sensor counter element includes a magnetic flux sensor.

5. The steering assist device in accordance with claim 1 wherein the sensor element, the first sensor counter element and the second sensor counter element are parts of an angle rotation sensor, which is configured to detect a relative rotation of the steering-wheel-side steering shaft compared to the wheel-side steering shaft.

6. The steering assist device in accordance with claim 1 wherein the steering-wheel-side steering shaft and the wheel-side steering shaft are coupled to each other by a torsion element.

7. The steering assist device in accordance with claim 6 wherein the sensor element, the first sensor counter element and the second sensor counter element in connection with the torsion element are part of a torque sensor, which is configured to detect a steering torque applied to the steering-wheel-side steering shaft.

8. The steering assist device in accordance with claim 1 wherein the gear wheel is made of plastic at least in sections.

9. The steering assist device in accordance with claim 1 wherein a third sensor counter element, which is positioned fixed in space, interacts with the gear wheel.

10. The steering assist device in accordance with claim 9 wherein the third sensor counter element is part of an angle rotation sensor, which is configured to detect a rotational position of the wheel-side steering shaft.

11. The steering assist device in accordance with claim 9 wherein the third sensor counter element includes a magnetic flux sensor.

12. The steering assist device in accordance with claim 9 wherein the third sensor counter element interacts with the gear wheel over a transmission.

13. The steering assist device in accordance with claim 12 wherein the transmission includes a first, rotationally fixed transmission wheel connected with the gear wheel, which is coupled to a second transmission wheel enclosing a rotation axis fixed in space.

14. The steering assist device in accordance with claim 13 wherein at least one magnetic element is positioned at the second transmission wheel.

15. The steering assist device in accordance with claim 1 wherein at least one stop is provided at the gear wheel, with which a relative rotation of the steering-wheel-side steering shaft is limited compared to the wheel-side steering shaft.

16. A steering assist device for a motor vehicle, the steering assist device comprising:
    a steering-wheel-side steering shaft;
    a wheel-side steering shaft coupled to the steering-wheel-side steering shaft;
    a gear wheel coupled to a backup drive and attached to the wheel-side steering shaft;
    a first sensor counter element attached to the steering-wheel-side steering shaft;
    a second sensor counter element fixed in space;
    a third sensor counter element fixed in space and interacting with the gear wheel, the third sensor counter element being part of an angle rotation sensor that is configured to detect a rotational position of the wheel-side steering shaft; and
    a sensor element integrated in the gear wheel, the sensor element interacting with the first and second sensor counter elements.

17. The steering assist device in accordance with claim 16 wherein the sensor element includes at least one magnetic element, the first sensor counter element includes a variable magnetic resistor or a magnetic flux conductor, the second sensor counter element includes a magnetic flux sensor, and the third sensor counter element includes a magnetic flux sensor.

18. A steering assist device for a motor vehicle, the steering assist device comprising:
    a support structure in the motor vehicle;
    a steering-wheel-side steering shaft rotatable relative to the support structure;
    a wheel-side steering shaft rotatable relative to both the steering-wheel-side steering shaft and the support structure;
    a gear wheel attached to the wheel-side steering shaft and rotatable relative to both the steering-wheel-side steering shaft and the support structure;

a backup drive for applying a torque to the wheel-side steering shaft through the gear wheel; and an angle rotation sensor for detecting a relative rotation of the steering-wheel-side steering shaft compared to the wheel-side steering shaft, the angle rotation sensor including a first sensor counter element rotationally fixed to the support structure, a second sensor counter element rotationally fixed to the steering-wheel-side steering shaft and rotatable relative to the first sensor counter element, and a sensor element integrated in the gear wheel and interacting with the first and second sensor counter elements.

19. The steering assist device in accordance with claim 18 wherein the sensor element includes at least one magnetic element, the first sensor counter element includes a magnetic flux sensor, and the second sensor counter element includes a variable magnetic resistor or a magnetic flux conductor.

20. The steering assist device in accordance with claim 18 wherein the support structure is a housing that encases at least a portion of the gear wheel.

* * * * *